United States Patent
Brioschi

(10) Patent No.: US 12,499,125 B2
(45) Date of Patent: Dec. 16, 2025

(54) SYNCHRONIZATION OF UNINTERRUPTIBLE POWER SUPPLY, UPS, INFORMATION COLLECTOR

(71) Applicant: ABB Schweiz AG, Baden (CH)

(72) Inventor: Massimiliano Brioschi, Locarno (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/680,105

(22) Filed: May 31, 2024

(65) Prior Publication Data
US 2024/0405598 A1 Dec. 5, 2024

(30) Foreign Application Priority Data
Jun. 2, 2023 (EP) .................................... 23176912

(51) Int. Cl.
*G06F 16/27* (2019.01)
*G06F 16/178* (2019.01)

(52) U.S. Cl.
CPC ............ *G06F 16/27* (2019.01); *G06F 16/178* (2019.01)

(58) Field of Classification Search
None
See application file for complete search history.

(56) References Cited

U.S. PATENT DOCUMENTS

| | | |
|---|---|---|
| 6,671,757 B1 | 12/2003 | Multer et al. |
| 8,805,783 B2 | 8/2014 | Muhunthan et al. |
| 8,849,955 B2 | 9/2014 | Prahlad et al. |
| 9,189,533 B2 | 11/2015 | Wautier et al. |
| 9,237,170 B2 | 1/2016 | Kiang et al. |
| 10,649,858 B2 | 5/2020 | Braddy et al. |
| 10,791,538 B1 | 9/2020 | Saraf et al. |
| 10,986,182 B1 | 4/2021 | Burnett et al. |
| 11,025,718 B2 | 6/2021 | Savage et al. |
| 11,086,825 B2 | 8/2021 | Chung et al. |
| 2011/0276713 A1 | 11/2011 | Brand |
| 2012/0030424 A1 | 2/2012 | Nunez et al. |
| 2013/0268491 A1 | 10/2013 | Chung et al. |

(Continued)

FOREIGN PATENT DOCUMENTS

| | | | |
|---|---|---|---|
| CN | 107656705 A | * 2/2018 | ........... G06F 3/0665 |
| CN | 207743764 U | 8/2018 | |

OTHER PUBLICATIONS

European Patent Office, Extended European Search Report in European Patent Application No. 23176912.6, 8 pp. (Dec. 12, 2023).

*Primary Examiner* — Neveen Abel Jalil
*Assistant Examiner* — John J Morris
(74) *Attorney, Agent, or Firm* — Leydig, Voit & Mayer, Ltd.

(57) ABSTRACT

A computer-implemented method for synchronizing at least one Uninterruptible Power Supply, UPS, information collector and at least one other UPS information collector, comprising: providing at least one virtual UPS information aggregator for synchronizing the at least one UPS information collector and the at least one other UPS information collector, wherein the at least one virtual UPS information aggregator executes the following steps: identifying of new UPS information on the at least one UPS information collector, transferring the identified new UPS information to the at least one other UPS information collector.

8 Claims, 4 Drawing Sheets

(56) References Cited

U.S. PATENT DOCUMENTS

2015/0180920 A1* 6/2015 Hunter .................. H04L 67/025
                                                              709/203
2017/0371696 A1   12/2017 Prziborowski et al.
2021/0157628 A1   5/2021 Dornemann et al.

* cited by examiner

SYNCHRONIZATION OF UNINTERRUPTIBLE POWER SUPPLY, UPS, INFORMATION COLLECTOR

CROSS-REFERENCE TO RELATED APPLICATIONS

The instant application claims priority to European Patent Application No. 23176912.6, filed Jun. 2, 2023, which is incorporated herein in its entirety by reference.

FIELD OF THE DISCLOSURE

The instant disclosure generally relates to uninterruptible power supplies (UPS).

BACKGROUND OF THE INVENTION

The general background of this disclosure is the synchronization of Uninterruptible Power Supply, UPS, information collector. Today, the use of Uninterruptible Power Supply, UPS, systems in protected hardware such as computers, data centers, telecommunication and medical equipment or other electrical equipment, where an unexpected power disruption could cause injuries, fatalities, serious business disruptions or data losses, is quiet common. These UPS systems, in particular a plurality of UPS systems are monitored and controlled by service providers via network and/or cloud platforms, in particular Uninterruptible Power Supply, UPS, information collectors. Due to the increasing need of data storage, technical development of the Uninterruptible Power Supply, UPS, information collectors, used Uninterruptible Power Supply, UPS, information collectors occasionally needs to be replaced with newer UPS information collector. However, the replacement and introduction of a new UPS information collector is sometimes difficult. For instance, occurring activities/problems may be: a high number of site visits for each customer and each site where a UPS system is installed, access to each UPSs in customers premises has to be given to update communication hardware/software to enable communications to a new UPS information collector, which often leads to a loosing of the connection to the source UPS information collector, migration of all collected UPS information into the new UPS information collector is time consuming and labor-intensive, because each UPS system has to be monitored separately, and, based on the amount of information/data, the possible downtime of the UPS monitoring system accessed by customers is quiet high. Based on these activities/problems, a replacement and introduction of a new UPS information collector cannot be performed on all UPS systems at the same time, i.e. switch off the source UPS information collector and switch on the new UPS information collector cannot be done in one shot. Thereby, a certain amount of information could be lost due to this asynchronous transition of UPS information from the old UPS information collector to the new UPS information collector.

In common technical practice, it is tried to avoid these actions/problems by providing a backup of all the UPS information from the source UPS information collector in a certain date/time could be restored to the new UPS information collector in one shot. However, since at that time not all UPS systems will be connected to the new UPS information collector, so these non-connected UPS systems still report information to the source UPS information collector, wherein this information will be lost.

BRIEF SUMMARY OF THE INVENTION

Based on the foregoing, there is a need to provide a more flexible, reliable and advanced way for replacing and introducing of a new UPS information collector without a loss of UPS information, which can be executed for a plurality of UPS information collectors at the same time.

The present disclosure generally describes a computer-implemented method for synchronizing at least one Uninterruptible Power Supply, UPS, information collector and at least one other UPS information collector, to a computer-implemented method for transferring completely Uninterruptible Power Supply, UPS, information from a UPS information collector to at least one other UPS information collector, and to a method for UPS information loss free replacing a source UPS information collector with a destination UPS information collector.

In one aspect of the present disclosure, a computer-implemented method for synchronizing at least one Uninterruptible Power Supply, UPS, information collector and at least one other UPS information collector is presented. The method comprises the following steps: providing at least one virtual UPS information aggregator for synchronizing the at least one UPS information collector and the at least one other UPS information collector, wherein the at least one virtual UPS information aggregator executes the following steps: identifying of UPS information on the at least one UPS information collector, and transferring the identified UPS information and new UPS information to the at least one other UPS information collector.

The term Uninterruptible Power Supply, UPS, system, as used herein is to be understood broadly and represents any electrical device that provides emergency power to a load, when the input power source or mains power fails. UPS systems differ from an auxiliary power system, emergency power system or standby generator in that it will provide near-instantaneous protection from input power interruptions, by supplying energy stored in batteries, super capacitors, or flywheels. The on-battery run-time of most uninterruptible power supplies is relatively short (only a few minutes) but sufficient to start a standby power source or properly shut down the protected equipment. It is a type of continual power system. UPS systems are typically used to protect critical hardware such as computers, data centers, telecommunication and medical equipment or other electrical equipment, where an unexpected power disruption could cause injuries, fatalities, serious business disruptions or data losses. The UPS system may be directly or indirectly connected via a cloud platform or the internet connected to at least one Uninterruptible Power Supply, UPS, information collector. In other words, it may be possible that the UPS system and the information collector may be separated from each other and are communicatively connected to each other. For instance, a certain amount of UPS systems (about 600) deliver UPS information/UPS information to at least one Uninterruptible Power Supply, UPS, monitoring platform, in particular at least one Uninterruptible Power Supply, UPS, information collector.

The term synchronizing as used herein is to be understood broadly and represents any method for mirroring and writing occurring new information on both at least one Uninterruptible Power Supply, UPS, information collector and at least one other UPS information collector. In other word, when the at least one Uninterruptible Power Supply, UPS, information collector and at least one other UPS information collector are synchronized, new information are both transferred and stored at the at least one Uninterruptible Power Supply, UPS, information collector and at least one other UPS information collector at the same time. The synchronization can be provided continuously or at pre-determined, pre-set time steps, time ranges, or time intervals e.g. one's a month or an hour.

The term Uninterruptible Power Supply, UPS, information collector as used herein is to be understood broadly and could represents any cloud platform, which is configured to receive UPS information and monitored these UPS information from at least one UPS system, in particular a plurality of UPS systems. The Uninterruptible Power Supply, UPS, information collector may be arranged/located directly at the site of the UPS system or at a service provider, but is not limited thereto. The Uninterruptible Power Supply, UPS, information collector may be connected to an interface, on which a controller/monitorer can manually control/monitor the at least one UPS system being connected to the Uninterruptible Power Supply, UPS, information collector. The controller/monitorer may be a human or a computer including an artificial intelligence, but is not limited thereto. The Uninterruptible Power Supply, UPS, information collector includes a database, on which all UPS information of the at least one UPS system being connected to the Uninterruptible Power Supply, UPS, information collector are stored. For instance, the Uninterruptible Power Supply, UPS, information collector may be an ABB Ability™ Smart Tracker, but is not limited thereto.

The term virtual UPS information aggregator as used herein is to be understood broadly and represents any virtual component, i.e. a software, which is capable to synchronize a source at least one UPS information collector and at least one other UPS information collector. The virtual UPS information aggregator is capable to execute the steps of identifying of new UPS information on the at least one UPS information collector and transferring the identified new UPS information to the at least one other UPS information collector. The identification of new UPS information on the at least one UPS information collector can be provided continuously or at pre-determined, pre-set time steps, time ranges, or time intervals e.g. one's a month or an hour. Additionally or alternatively, the virtual UPS information aggregator is capable to process and/or prepare the identified new UPS information on the at least one UPS information collector for the at least one other UPS information collector. The number of the used virtual UPS information aggregator may be one, at least two or corresponds/is identical to the number of the at least one (source) UPS information collectors. The at least one virtual UPS information aggregator may be hosted on one, a plurality of or all UPS information collectors of the at least one UPS information collector and/or of the at least one other UPS information collector and/or is hosted on at least one other UPS information collector. In other words, the virtual UPS information aggregator checks/waits for new incoming information in the source UPS information collector, and as soon as new information is available it sends them to the destination UPS information collector. For instance, the virtual UPS information aggregator may be a software component composed by: an input interface, to link to the source UPS cloud platform using source platform ABB iUPSGuard APIs, which will be used to detect new incoming information in a continuous loop, a processing unit which filter/reshape existing information and/or generate new information from existing information for preparing the information for the destination cloud platform, and output interface, to link to the destination cloud platform using destination platform ABB Ability™ Smart Tracker APIs. In case the destination UPS information collector is the ABB Ability™ Smart Tracker, the virtual UPS information aggregator output interface could be very similar to the one currently implemented in the latest ANC/ANC-L, ABB UPS network card.

The term UPS information and new UPS information as used herein are to be understood broadly in the present case and represents any kind of information being provided/received by the UPS system and being forwarded to the at least one (source) UPS information collector. The term "new" defines that these information are provided at this moment or in near future. The UPS information and/or the new UPS information may include identification information, alarms, status, events, counters, measurements and/or configuration parameters.

The term information and/or data as used herein is to be understood broadly in the present case and represents any kind of data. Data may be single numbers/numerical values, a plurality of a numbers/numerical values, a plurality of a numbers/numerical values being arranged within a list, an integer, and a string, but are not limited thereto.

BRIEF DESCRIPTION OF THE SEVERAL VIEWS OF THE DRAWING(S)

DETAILED DESCRIPTION OF THE INVENTION

Figure 1:
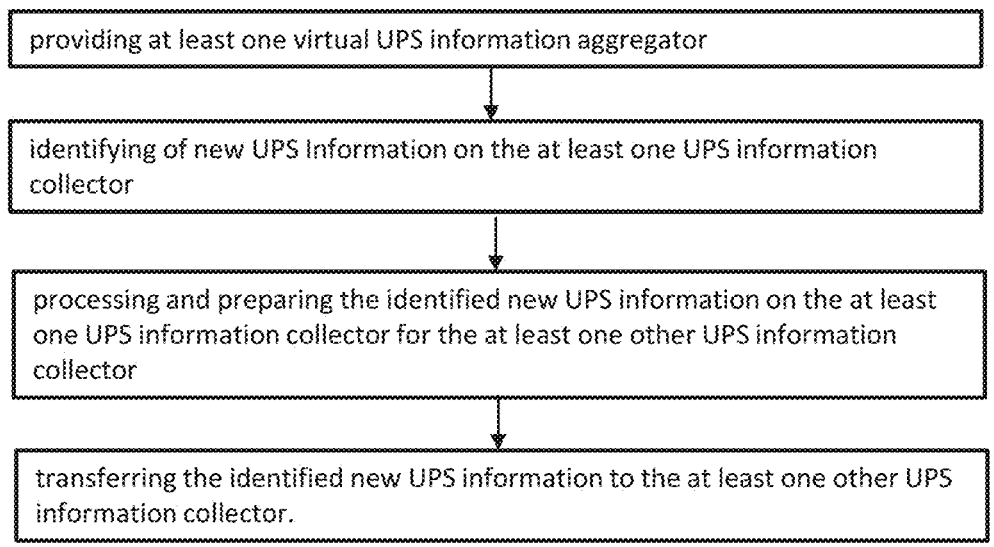
FIG. 1 is a flowchart for a computer-implemented method for synchronizing at least one Uninterruptible Power Supply, UPS, information collector and at least one other UPS information collector, in accordance with the disclosure.

FIG. 1 illustrates a flow diagram of a computer-implemented method for synchronizing at least one Uninterruptible Power Supply, UPS, information collector and at least one other UPS information collector. In a step, at least one virtual UPS information aggregator for synchronizing the at least one UPS information collector and the at least one other UPS information collector is provided. The at least one virtual UPS information aggregator is a software. The virtual UPS information aggregator is capable to execute at least two sub steps. In a first sub step, the virtual UPS information aggregator identifies new UPS information on the at least one UPS information collector. In a second sub step, the virtual UPS information aggregator transfers the identified new UPS information to at least one other UPS information collector.

Optionally, the at least one virtual UPS information aggregator is capable to execute a further sub step. In this further sub step, the identified new UPS information on the at least one UPS information collector are processed and prepared for the at least one other UPS information collector.

Figure 2:
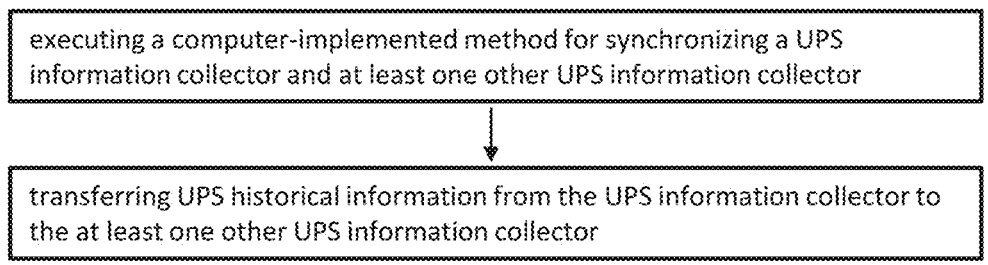
FIG. 2 is a flowchart for a computer-implemented method for transferring completely Uninterruptible Power Supply, UPS, information from a UPS information collector to at least one other UPS information collector, in accordance with the disclosure.

FIG. 2 illustrates a flow diagram of a computer-implemented method for transferring completely Uninterruptible Power Supply, UPS, information from a UPS information collector to at least one other UPS information collector. In a first step a computer-implemented method for synchronizing a UPS information collector and at least one other UPS information collector is executed. In a second step UPS historical information are transferred from the UPS information collector to the at least one other UPS information collector. The transferring of UPS historical information is only executed when the synchronization of the UPS information collector and the at least one other UPS information collector is provided.

Figure 3:
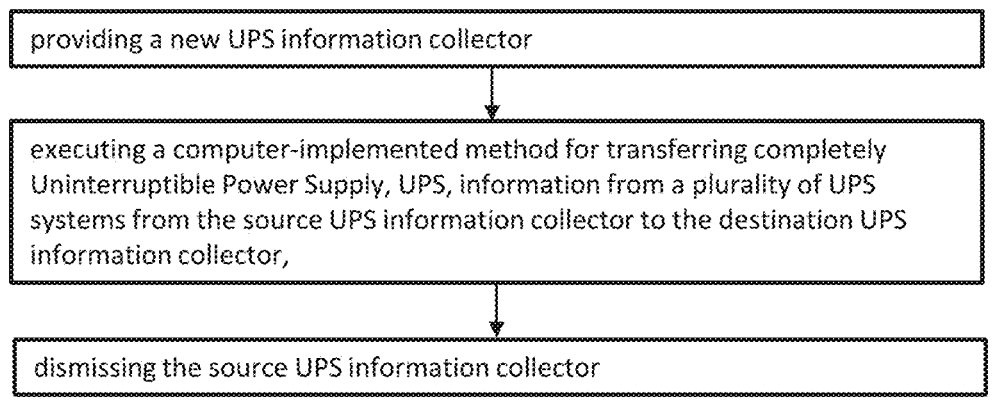
FIG. 3 is a flowchart for a method for UPS information loss free replacing a source UPS information collector with a destination UPS information collector, in accordance with the disclosure.

FIG. 3 illustrates a flow diagram of a method for UPS information loss free replacing a source UPS information collector with a destination UPS information collector. In a first step, a destination UPS information collector is provided. In a second step, a computer-implemented method for transferring completely Uninterruptible Power Supply, UPS, information from a plurality of UPS systems from the source UPS information collector to the destination UPS information collector is executed. In a third step, the source UPS information collector is dismissed.

Figure 4:
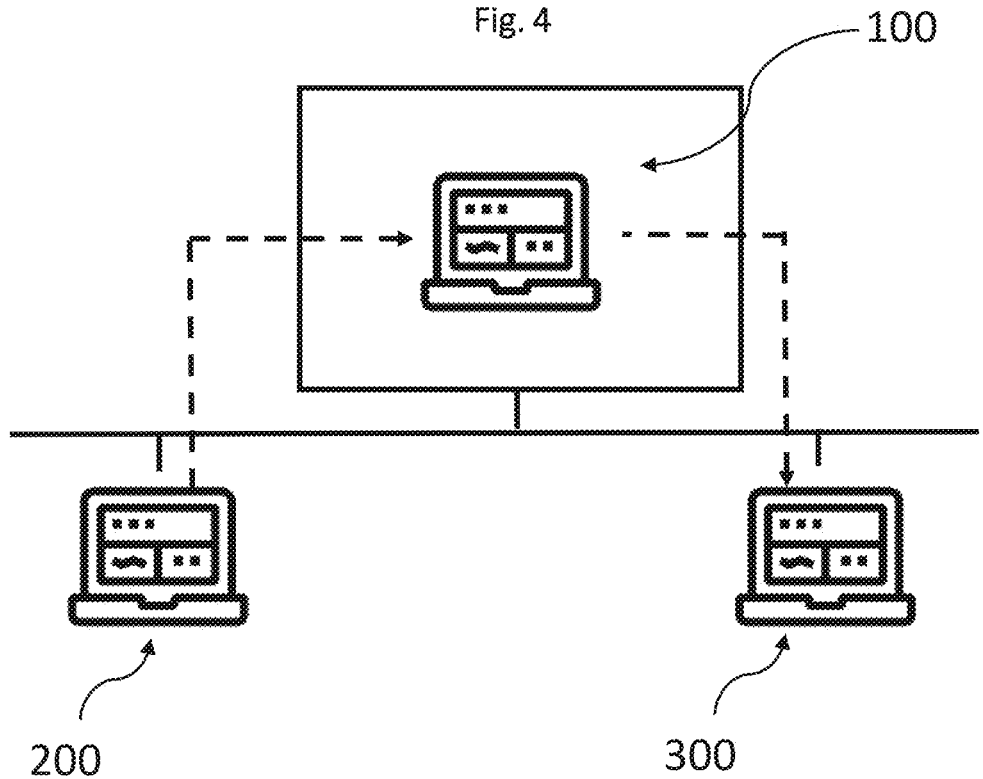
FIG. 4 is a block diagram of a system for synchronization of at least one UPS information collector and at least one other UPS information collector, in accordance with the disclosure.

FIG. 4 illustrates an overview of a synchronization of at least one UPS information collector 200 and at least one other UPS information collector 300. The at least one UPS information collector 200 and at least one other UPS information collector 300 are synchronized by a virtual UPS information aggregator 100. The virtual UPS information aggregator is located at a local network or is hosted in the cloud. The at least one UPS information collector 200, the at least one other UPS information collector 300 and the virtual UPS information aggregator 100 are connected by a Wide Area Network, WAN. The at least one UPS information collector 200 provides UPS information to the virtual UPS information aggregator 100 and the virtual UPS information aggregator 100 provides UPS information to the at least one other UPS information collector 300. Thereby, the virtual UPS information aggregator 100 provides a UPS information collector to UPS information collector information synchronization.

Figure 5:
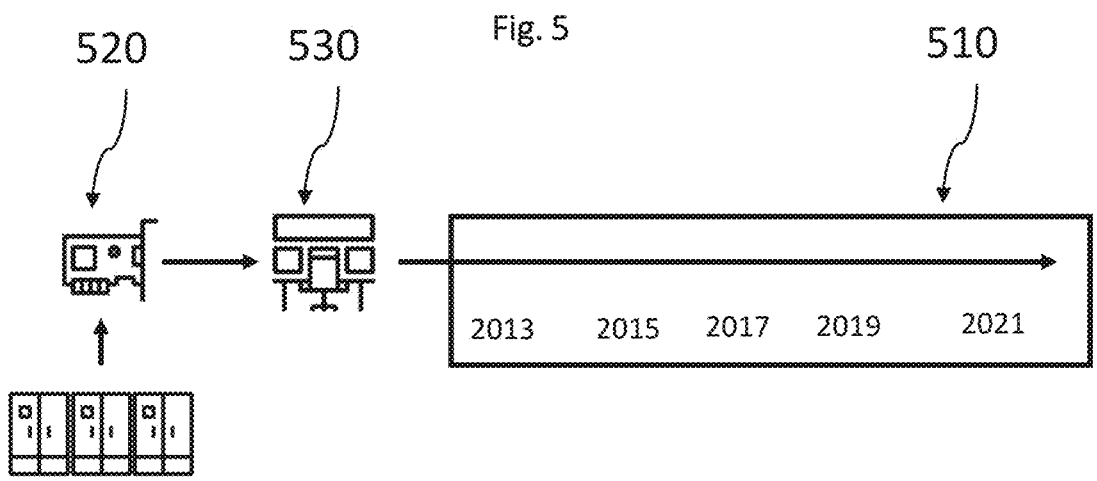
FIG. 5 is a diagram of an overview of a first step of a situation of a UPS information loss free replacing a source UPS information collector with a destination UPS information collector in accordance with the disclosure.

FIG. 5 illustrates an overview of a first step of a situation of a UPS information loss free replacing a source UPS information collector with a destination UPS information collector. The first step is the initial step, in which a UPS information collector 530 to be replaced by another UPS information collector is coupled to the at least one UPS system 540. The UPS information collector 530/510 comprises a database including a historical and actual UPS information. The UPS information collector 530 is communicatively coupled to the at least one UPS system 540 by a network adapter, in particular an ABB ELIS SNMP-Web Network Adapter.

Figure 6:
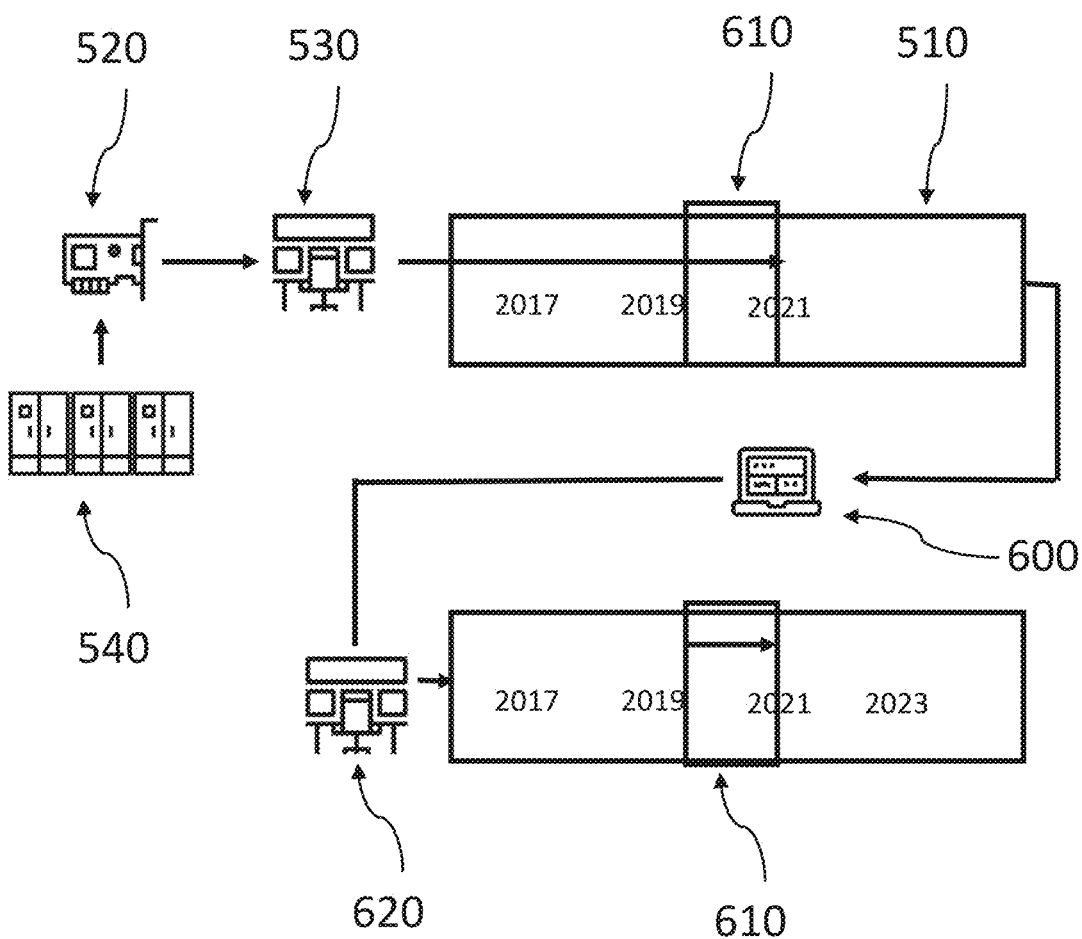
FIG. 6 is a diagram of an overview of a second step of a situation of a UPS information loss free replacing a source UPS information collector with a destination UPS information collector in accordance with the disclosure.

FIG. 6 illustrates an overview of a second step of a situation of a UPS information loss free replacing a source UPS information collector with a destination UPS information collector. In the second step, a virtual UPS information aggregator 600 is interposed/interconnected between the UPS information collector 530/510 to be replaced by another UPS information collector and the other UPS information collector. The virtual UPS information aggregator 600 synchronizes 610 the source UPS information collector 530/510 with a destination UPS information collector 620. Therefore, all UPS information being received after a starting point of the synchronization are both stored in the source UPS information collector 530/510 and the destination UPS information collector 620.

Figure 7:
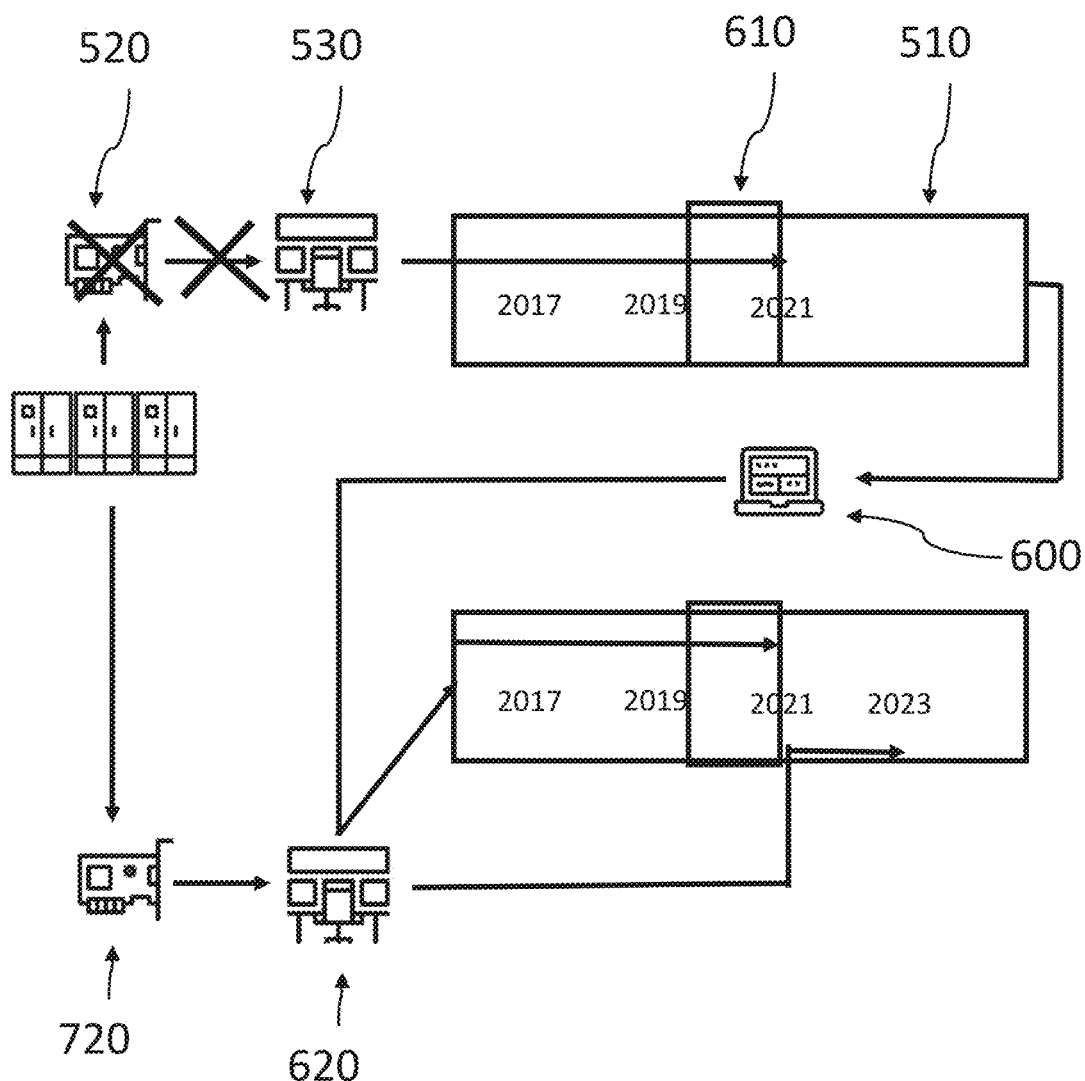
FIG. 7 is a diagram of an overview of a third step of a situation of a UPS information loss free replacing a source UPS information collector with a destination UPS information collector in accordance with the disclosure.

FIG. 7 illustrates an overview of a third step of a situation of a UPS information loss free replacing a source UPS information collector with a destination UPS information collector. In this step, during the synchronization of the source UPS information collector 530/510 with a destination UPS information collector 620, the virtual UPS information aggregator 600 transfers historical UPS information from the source UPS information collector 530/510 to the destination UPS information collector 620, such that both UPS information collectors include the same UPS information. Additionally, the destination UPS information collector 620 is communicatively coupled to the at least one UPS system 540 by another network adapter 720, in particular an ABB ANC-L Network Card. The destination UPS information collector 620 receives the new UPS information being provided by the UPS system 540 after the coupling of both elements.

Figure 8:
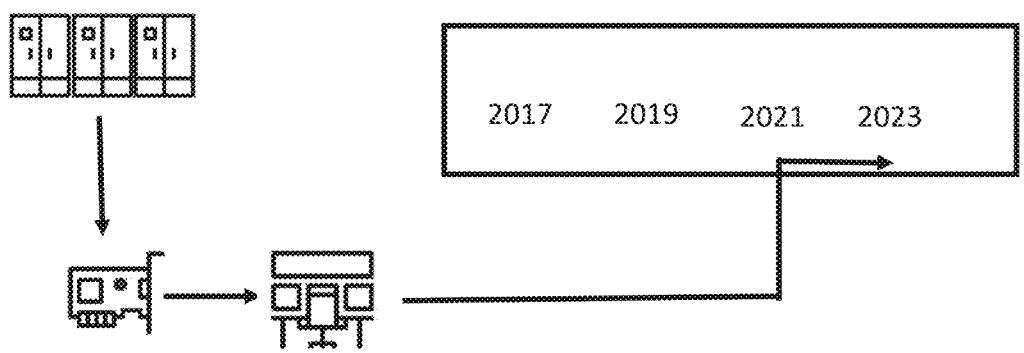
FIG. 8 is a diagram of an overview of a fourth step of a situation of a UPS information loss free replacing a source UPS information collector with a destination UPS information collector.

FIG. 8 illustrates an overview of a fourth step of a situation of a UPS information loss free replacing a source UPS information collector with a destination UPS information collector. In this step, the source UPS information collector 530/510 and the virtual UPS information aggregator 600 is dismissed, when all UPS information are transferred from the source UPS information collector 530/510 to the destination UPS information collector 620.

The present disclosure has been described in conjunction with a preferred embodiment as examples as well. However, other variations can be understood and effected by those persons skilled in the art and practicing the claimed invention, from the studies of the drawings, this disclosure and the claims. Notably, in particular, the any steps presented can be performed in any order, i.e. the present invention is not limited to a specific order of these steps. Moreover, it is also not required that the different steps are performed at a certain place or at one node of a distributed system, i.e. each of the steps may be performed at a different nodes using different equipment/information processing units.

In the claims as well as in the description the word "comprising" does not exclude other elements or steps and the indefinite article "a" or "a" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

By synchronizing at least one Uninterruptible Power Supply, UPS, information collector and at least one other UPS information collector, the above mentioned activities/problems can be reliably prevented such that a replacement and introduction of a new UPS information collector can be performed at the same time, i.e. switch off the old UPS information collector and switch on the new UPS information collector can be done in one shot. Thereby, a loss of certain amount of information can be prevented. Hence, a more flexible, reliable and advanced way for replacing and introducing of a new UPS information collector without a loss of UPS information/information can be provided, which can be executed for a plurality of UPS information collectors at the same time.

In an embodiment of the method for synchronizing at least one Uninterruptible Power Supply, UPS, information collector and at least one other UPS information collector, the identifying of new UPS information on the at least one UPS information collector includes a continuous identification of new UPS information. By identifying new UPS information in a continuous manner, a synchronization, which is actual i.e. all time updated, can be provided.

In an embodiment of the method for synchronizing at least one Uninterruptible Power Supply, UPS, information collector and at least one other UPS information collector, the at least one virtual UPS information aggregator executes the further step: processing and preparing the identified new UPS information on the at least one UPS information collector for the at least one other UPS information collector.

The term processing and preparing as used herein is to be understood broadly in the present case and represents any method for filtering the identified new UPS information, for manipulate the identified new UPS information, for reshaping of the identified new UPS information, for adapt the data format of the identified new UPS information and/or a generation of other data from the identified new UPS information.

By preprocessing and preparing the identified new UPS information a transferring of these information from the at least one UPS information collector to the at least one other UPS information collector can be simplified, e.g. computing capacity and/or the occurrence of incompatibilities can be significantly reduced.

In an embodiment of the method for synchronizing at least one Uninterruptible Power Supply, UPS, information collector and at least one other UPS information collector, the processing and preparing of the identified new UPS information includes a filtering of the identified new UPS information, a manipulation of the identified new UPS information, a reshaping of the identified new UPS information, an adaption of the data format of the identified new UPS information and/or a generation of other information from the identified new UPS information.

In an embodiment of the method for synchronizing at least one Uninterruptible Power Supply, UPS, information collector and at least one other UPS information collector, the number of the at least one virtual UPS information aggregator corresponds to the number of the at least one UPS information collector and/or the at least one other UPS information collector.

By corresponding the number of the at least one virtual UPS information aggregator to the number of the at least one UPS information collector and/or the at least one other UPS information collector, a plurality of UPS information from a plurality of different UPS information collectors can be transferred to a plurality of other UPS information collectors.

In an embodiment of the method for synchronizing at least one Uninterruptible Power Supply, UPS, information collector and at least one other UPS information collector, the at least one virtual UPS information aggregator is hosted on one, a plurality of or all cloud platforms of the at least one UPS information collector and/or of the at least one other UPS information collector and/or is hosted on at least one other cloud platform.

In a further aspect, a computer-implemented method for transferring completely Uninterruptible Power Supply, UPS, information from a UPS information collector to at least one other UPS information collector is presented, comprising: executing a computer-implemented method for synchronizing a UPS information collector and at least one other UPS information collector as described above, and transferring UPS historical information from the UPS information collector to the at least one other UPS information collector, wherein the transferring of UPS historical information is executed when the synchronization of the UPS information collector and the at least one other UPS information collector is provided.

The term UPS historical information as used herein is to be understood broadly in the present case and represents any kind of information being provided/received by the UPS system and being forwarded to the at least one (source) UPS information collector. The term "historical" defines that this information are provided before this moment or in the past. The UPS information and/or the historical UPS information may include identification information, alarms, status, events, counters, measurements and/or configuration parameter, but are not limited thereto. The UPS information, new UPS information and/or UPS historical information may be identical or different.

By synchronizing at least one UPS information collector and at least one other UPS information collector any by transferring UPS historical information from the at least one UPS information collector and at least one other UPS information collector when the synchronization of the UPS information collector and the at least one other UPS information collector is provided, an UPS information transfer without any loss of UPS information can be provided.

In an embodiment of the method for transferring completely Uninterruptible Power Supply, UPS, information from a UPS information collector to at least one other UPS information collector, the UPS historical information may include identification information, alarms, status, events, counters, measurements and/or configuration parameter, but are not limited thereto.

In an embodiment of the method for transferring completely Uninterruptible Power Supply, UPS, information from a UPS information collector to at least one other UPS information collector, the new UPS information may include identification information, alarms, status, events, counters, measurements and/or configuration parameter, but are not limited thereto.

In a further aspect, a method for UPS information loss free replacing a source UPS information collector with a destination UPS information collector is presented, comprising: providing a destination UPS information collector, executing a computer-implemented method as described above for transferring completely Uninterruptible Power Supply, UPS, information from a plurality of UPS systems from the source UPS information collector to the destination UPS information collector, dismissing the source UPS information collector.

The term dismissing as used herein is to be understood broadly in the present case and represents that the source UPS information collector is disconnected from e.g. the internet or network and kept offline. Thereby, a retrieving of the content, i.e. information, on the source platform is still possible.

By synchronizing at least one UPS information collector and at least one other UPS information collector any by transferring UPS historical information from the at least one UPS information collector and at least one other UPS information collector when the synchronization of the UPS information collector and the at least one other UPS information collector is provided, an UPS information loss free replacing a source UPS information collector with a destination UPS information collector can be provided.

In a further aspect a computer-readable storage medium comprising instructions which, when executed by a computer, cause the computer to carry out the method for synchronizing at least one Uninterruptible Power Supply, UPS, information collector and at least one other UPS information collector as described above, the method for transferring completely Uninterruptible Power Supply, UPS, information from a UPS information collector to at least one other UPS information collector as described above, and/or the method for UPS information loss free replacing a source UPS information collector with a destination UPS information collector as described above.

Any disclosure and embodiments described herein relate to the methods lined out above and vice versa. Advantageously, the benefits provided by any of the embodiments and examples equally apply to all other embodiments and examples and vice versa.

As used herein "determining" also includes "initiating or causing to determine", "generating" also includes "initiating or causing to generate" and "providing" also includes "initiating or causing to determine, generate, select, send or receive". "Initiating or causing to perform an action" includes any processing signal that triggers a computing device to perform the respective action.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for synchronizing at least one Uninterruptible Power Supply (UPS) information collector and at least one other UPS information collector, comprising:
    providing at least one virtual UPS information aggregator for synchronizing the at least one UPS information collector and the at least one other UPS information collector, wherein the at least one virtual UPS information aggregator executes the following:
    identifying of new UPS information on the at least one UPS information collector,
    processing and preparing the identified new UPS information on the at least one UPS information collector for the at least one other UPS information collector, wherein the at least one virtual UPS information aggregator comprises an input interface for linking to the at least one UPS information collector via specific application protocol interfaces (APIs), wherein the input interface is configured to detect, continuously, the new UPS information from the at least one UPS information collector and prepare the new UPS information for the other UPS information collector, and wherein the at least one virtual UPS information aggregator comprises an output interface for linking to the at least one other UPS information collector via other specific APIs,
    transferring the identified new UPS information to the at least one other UPS information collector, wherein the processing and preparing of the identified new UPS information includes a filtering of the identified new UPS information, a manipulation of the identified new UPS information, a reshaping of the identified new UPS information, an adaption of the data format of the identified new UPS information and a generation of other information from the identified new UPS information,
    transferring UPS historical information from the UPS information collector to the at least one other UPS information collector,
    wherein the transferring of UPS historical information is executed when the synchronization of the UPS information collector and the at least one other UPS information collector is provided, and
    dismissing the UPS information collector.

2. The computer-implemented method according to claim 1, wherein the identifying of new UPS information on the at least one UPS information collector includes a continuous identification of new UPS information.

3. The computer-implemented method according to claim 1, wherein the number of the at least one virtual UPS information aggregator corresponds to the number of the at least one UPS information collector and/or the at least one other UPS information collector.

4. The computer-implemented method according to claim 1, wherein the at least one virtual UPS information aggregator is hosted on one, a plurality of, or all cloud platforms of the at least one UPS information collector and/or of the at least one other UPS information collector and/or is hosted on at least one other cloud platform.

5. A computer-implemented method for transferring completely Uninterruptible Power Supply (UPS) information from a UPS information collector to at least one other UPS information collector, comprising:
- executing a computer-implemented method for synchronizing a UPS information collector and at least one other UPS information collector, the at least one other UPS information collector providing at least one virtual UPS information aggregator for synchronizing the at least one UPS information collector and the at least one other UPS information collector, wherein the at least one virtual UPS information aggregator executes the following:
- identifying of new UPS information on the at least one UPS information collector,
- processing and preparing the identified new UPS information on the at least one UPS information collector for the at least one other UPS information collector, wherein the at least one virtual UPS information aggregator comprises an input interface for linking to the at least one UPS information collector via specific application protocol interfaces (APIs), wherein the input interface is configured to detect, continuously, the new UPS information from the at least one UPS information collector and prepare the new UPS information for the other UPS information collector, and wherein the at least one virtual UPS information aggregator comprises an output interface for linking to the at least one other UPS information collector via other specific APIs,
- transferring the identified new UPS information to the at least one other UPS information collector;
- transferring UPS historical information from the UPS information collector to the at least one other UPS information collector;
- wherein the transferring of UPS historical information is executed when the synchronization of the UPS information collector and the at least one other UPS information collector is provided; and
- dismissing the UPS information collector, wherein the processing and preparing of the identified new UPS information includes a filtering of the identified new UPS information, a manipulation of the identified new UPS information, a reshaping of the identified new UPS information, an adaption of the data format of the identified new UPS information and a generation of other information from the identified new UPS information.

6. The computer-implemented method according to claim 5, wherein the UPS historical information include identification information, alarms, status, events, measurements and/or configuration parameter.

7. The computer-implemented method according to claim 5, wherein the new UPS information include identification information, alarms, status, events, counters, measurements and/or configuration parameter.

8. A method for uninterrupted power supply (UPS) information loss free replacing a source UPS information collector with a destination UPS information collector, comprising:
- providing a source UPS information collector and a destination UPS information collector,
- executing a computer-implemented method for synchronizing the source UPS information collector and the destination UPS information collector, the destination UPS information collector providing at least one virtual UPS information aggregator for synchronizing the source UPS information collector and the destination UPS information collector, wherein the at least one virtual UPS information aggregator executes the following:
- identifying of new UPS information on the source UPS information collector,
- processing and preparing the identified new UPS information on the source UPS information collector for the destination UPS information collector, wherein the at least one virtual UPS information aggregator comprises an input interface for linking to the source UPS information collector via specific application protocol interfaces (APIs), wherein the input interface is configured to detect, continuously, the new UPS information from the source UPS information collector and prepare the new UPS information for the destination UPS information collector, and wherein the at least one virtual UPS information aggregator comprises an output interface for linking to the destination UPS information collector via other specific APIs, and
- transferring the identified new UPS information to the at destination UPS information collector;
- transferring UPS historical information from the source UPS information collector to the destination UPS information collector;
- wherein the transferring of UPS historical information is executed when the synchronization of the source UPS information collector and the destination UPS information collector is provided; and
- dismissing the source UPS information collector, wherein the processing and preparing of the identified new UPS information includes a filtering of the identified new UPS information, a manipulation of the identified new UPS information, a reshaping of the identified new UPS information, an adaption of the data format of the identified new UPS information and a generation of other information from the identified new UPS information.

* * * * *